(12) United States Patent
Frota de Souza et al.

(10) Patent No.: US 12,337,398 B2
(45) Date of Patent: Jun. 24, 2025

(54) MODULAR DRILL, METHOD OF ASSEMBLY THEREOF, AND CUTTING INSERT

(71) Applicant: KENNAMETAL INC., Latrobe, PA (US)

(72) Inventors: Ruy Frota de Souza, Latrobe, PA (US); Marcelo Euripedes Da Silva, Piracicaba (BR); Neal Myers, Latrobe, PA (US); Manuel Wacinski, Mistelgau (DE)

(73) Assignee: KENNAMETAL INC., Latrobe, PA (US)

( * ) Notice: Subject to any disclaimer, the term of this patent is extended or adjusted under 35 U.S.C. 154(b) by 13 days.

(21) Appl. No.: 17/506,714

(22) Filed: Oct. 21, 2021

(65) Prior Publication Data

US 2023/0129071 A1    Apr. 27, 2023

(51) Int. Cl.
  *B23B 51/02*    (2006.01)
  *B23B 51/00*    (2006.01)
  *B23B 51/06*    (2006.01)

(52) U.S. Cl.
  CPC .......... *B23B 51/0003* (2022.01); *B23B 51/02* (2013.01); *B23B 51/068* (2022.01)

(58) Field of Classification Search
  CPC ............ B23B 51/0003; B23B 2240/36; B23B 2240/00; B23B 51/0002; B23B 2240/24;
  (Continued)

(56) References Cited

U.S. PATENT DOCUMENTS

2002/0168239 A1   11/2002   Mast
2003/0039523 A1   2/2003   Kemmer
(Continued)

FOREIGN PATENT DOCUMENTS

| KR | 200338408 | * | 1/2004 | ............. B23B 51/02 |
| KR | 101276319 | * | 6/2013 | ............. B23B 51/02 |

(Continued)

OTHER PUBLICATIONS

English translation of KR 200338408 (Year: 2004).*
(Continued)

*Primary Examiner* — Alan Snyder
(74) *Attorney, Agent, or Firm* — Christopher J. Owens

(57) ABSTRACT

A modular drill includes a shank, a retaining pin, a cutting insert, and a locking pin. The shank includes a shank bore having an axial direction leading into the shank bore, and a locking pin opening. The retaining pin includes a retaining pin shaft axially movable positioned with the shank bore, the retaining pin shaft having a locking pin engagement surface. The retaining pin includes a retaining pin head having a retaining pin head engagement surface. The cutting insert includes a cutting insert passage for passing the retaining pin head therethrough; and a cutting insert cavity having a cutting insert engagement surface for engaging the retaining pin head engagement surface. The locking pin is for positioning within the locking pin opening and engaging with the locking pin engagement surface to force the retaining pin shaft to move further in the axial direction.

22 Claims, 11 Drawing Sheets

(58) Field of Classification Search
CPC ............ B23B 51/0004; B23B 51/0005; B23B 2210/04; B23B 51/02; B23B 2240/04; B23C 2240/04
See application file for complete search history.

(56) References Cited

U.S. PATENT DOCUMENTS

| | | |
|---|---|---|
| 2003/0164597 A1 | 9/2003 | Kimura |
| 2006/0127194 A1 | 6/2006 | Schafer |
| 2011/0211921 A1 | 9/2011 | Volokh |
| 2013/0017028 A1* | 1/2013 | Fang ................. B23B 51/02 408/229 |
| 2015/0328693 A1 | 11/2015 | Koga |
| 2019/0381584 A1* | 12/2019 | Hayashi ................. B23B 51/00 |
| 2020/0180047 A1 | 6/2020 | Jager et al. |

FOREIGN PATENT DOCUMENTS

| | | | |
|---|---|---|---|
| WO | WO-2009128775 A1 * | 10/2009 | ............. B23B 51/02 |
| WO | WO-2012101622 A1 * | 8/2012 | ........... B23B 31/005 |

OTHER PUBLICATIONS

English translation of KR 101276319 (Year: 2013).*
Sep. 26, 2024 Foreign Office Action Chinese Application No. CN202211293543.8, 2 pages.

* cited by examiner

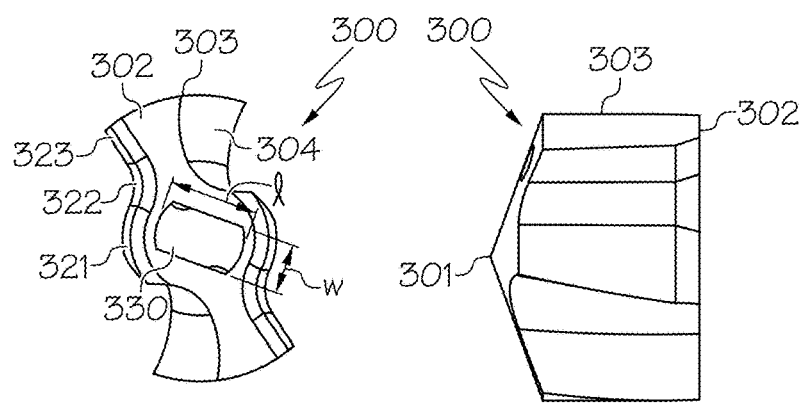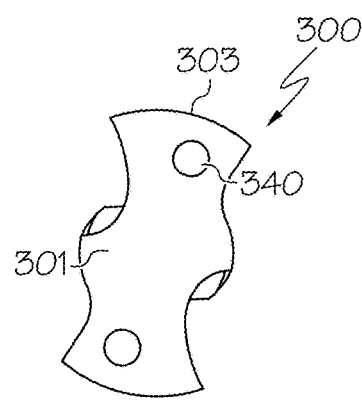
FIG. 6A  FIG. 6B  FIG. 6C
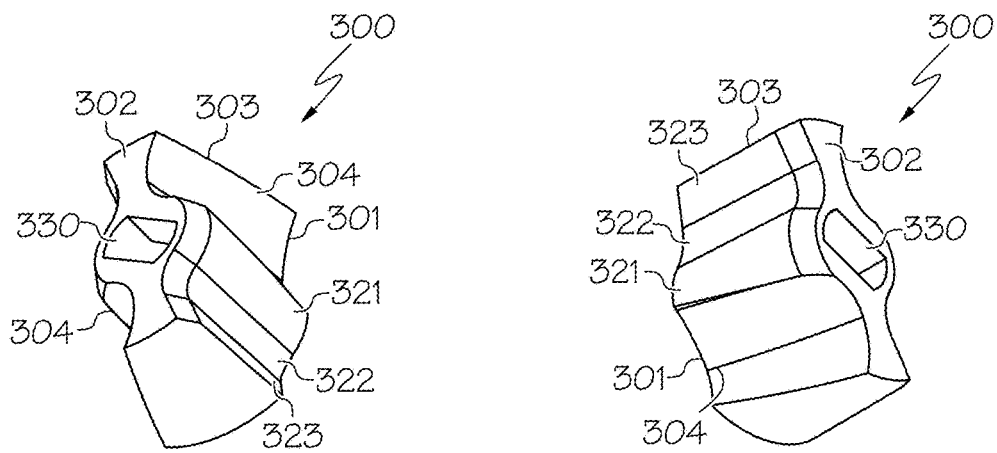
FIG. 6D  FIG. 6E
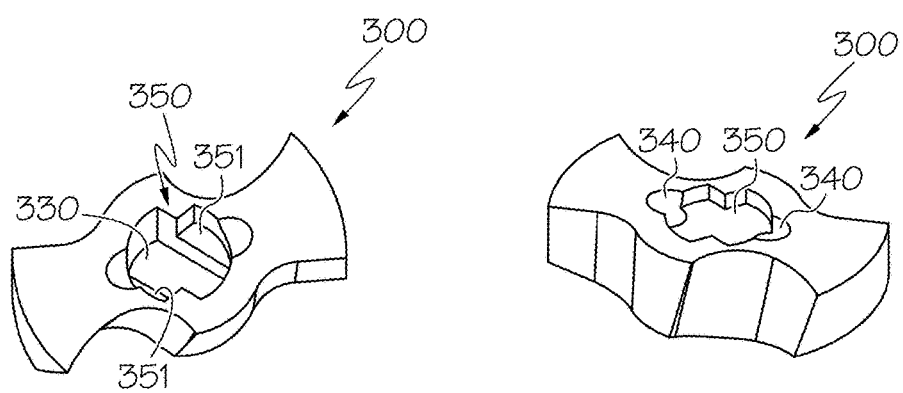
FIG. 6F  FIG. 6G

MODULAR DRILL, METHOD OF ASSEMBLY THEREOF, AND CUTTING INSERT

FIELD

The present application relates to the field of modular drills having replaceable cutting inserts.

BACKGROUND

According to the related art, there are modular drills having a shank and a replaceable cutting insert clamped in the shank. There is a need for an improved modular drill with reduced cost of manufacture, high reliability, and ease of assembly.

Accordingly, those skilled in the art continue with research and development in the field of modular drills.

SUMMARY

In one embodiment, a modular drill includes a shank, a retaining pin, a cutting insert, and a locking pin. The shank includes a shank bore having an axial direction leading into the shank bore and a locking pin opening. The retaining pin includes a retaining pin shaft axially movably positioned within the shank bore and a retaining pin head. The retaining pin shaft has a locking pin engagement surface. The retaining pin head has a retaining pin head engagement surface. The cutting insert includes a cutting insert passage for passing the retaining pin head therethrough and a cutting insert cavity having a cutting insert engagement surface for engaging the retaining pin head engagement surface. The locking pin is positionable within the locking pin opening for engaging with the locking pin engagement surface to force the retaining pin to move in the axial direction towards the shank.

In an aspect, the retaining pin shaft may be rotationally fixed within the shank bore.

In an aspect, the retaining pin shaft and the shank bore may have non-circular cross-sections.

In an aspect, the retaining pin shaft may include an axial recess. The shank bore may comprise an axial projection thereon configured to engage with the axial recess.

In an aspect, the locking pin opening may include internal threads, and the locking pin may include external threads corresponding to the internal threads of the locking pin.

In an aspect, the cutting insert includes one or more cooling channels therein configured to pass coolant from the cutting insert cavity to a cutting end of the cutting insert.

In an aspect, the coolant passes through the cutting insert passage to the cutting insert cavity to the cutting end of the cutting insert.

In another embodiment, a method of assembly for a modular drill includes: positioning a cutting insert into a shank pocket of a shank having a retaining pin therein while a retaining pin head of the retaining pin passes through a cutting insert passage of the cutting insert into a cutting insert cavity of the cutting insert; engaging a retaining pin head engagement surface of the retaining pin with a cutting insert engagement surface of the cutting insert cavity; and moving the retaining pin in an axial direction within a shank bore of the shank towards the shank to lock the cutting insert within the shank pocket of the shank.

In an aspect, the method may further include rotating the cutting insert relative to the retaining pin head and shank after the retaining pin head passes through the cutting insert passage into the cutting insert cavity.

In an aspect, the step of rotating the cutting insert relative to the retaining pin head and shank may include clamping the cutting insert by shank flanks of the shank.

In an aspect, the step of moving the retaining pin shaft in the axial direction within the shank bore towards the shank may include a spring pulling the retaining pin in the axial direction within the shank bore towards the shank.

In an aspect, the step of moving the retaining pin shaft in the axial direction within the shank bore towards the shank may include engaging a locking pin against the retaining pin shaft.

In an aspect, the step of engaging a locking pin against the retaining pin shaft may include screwing the locking pin towards the retaining pin shaft.

In an aspect, the step of moving the retaining pin shaft in the axial direction within the shank bore towards the shank may cause a clamping of the cutting insert by shank flanks of the shank.

In another embodiment, a cutting insert for a modular drill includes a cutting insert body having an upper end and a lower end and a cutting insert passage for passing a retaining pin head therethrough. The cutting insert passage leads from the lower surface of the cutting insert body to a cutting insert cavity. The cutting insert cavity defines a lower wall including a cutting insert engagement surface for engaging with retaining pin head passed through the cutting insert passage into the cutting insert cavity.

In an aspect, the cutting insert further includes one or more cooling channels therein configured to pass coolant from the cutting insert cavity to a cutting end of the cutting insert.

In an aspect, the coolant passes through the cutting insert passage to the cutting insert cavity to the cutting end of the cutting insert.

Other embodiments of the disclosed modular drill and method of assembly thereof, and cutting insert, will become apparent from the following detailed description, the accompanying drawings and the appended claims.

BRIEF DESCRIPTION OF THE DRAWINGS

FIG. 6A is a top view of the cutting insert of FIG. 1.

FIG. 6B is a side view of the cutting insert of FIG. 1.

FIG. 6C is a bottom view of the retaining pin of FIG. 1.

FIGS. 6D to 6G are perspective views of the retaining pin of FIG. 1.

DETAILED DESCRIPTION

Figure 1:
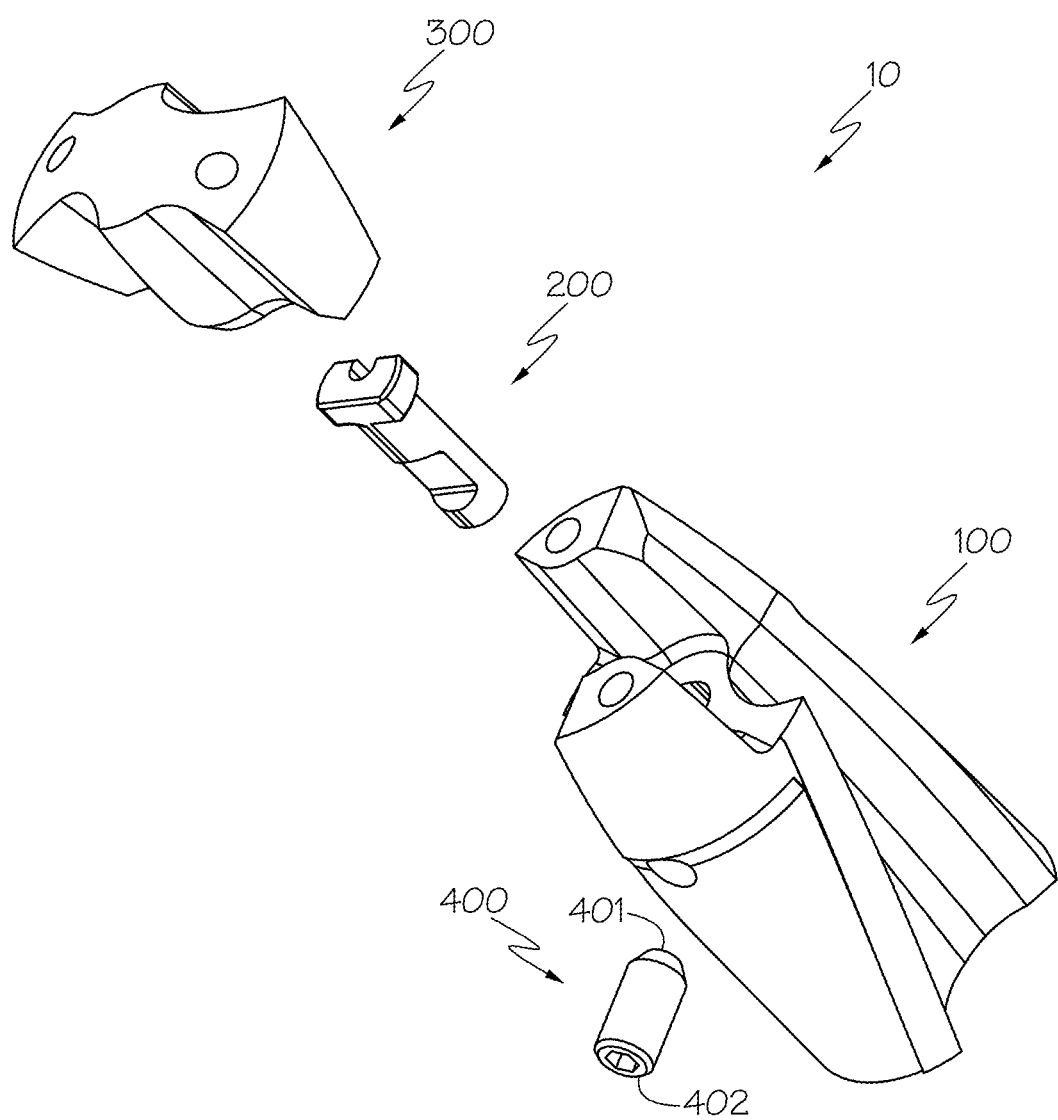
FIG. 1 is an exploded perspective view of an exemplary modular drill according to an embodiment of the present description, wherein the modular drill includes a shank, a cutting insert, a retaining pin, and locking pin.
Figure 2:
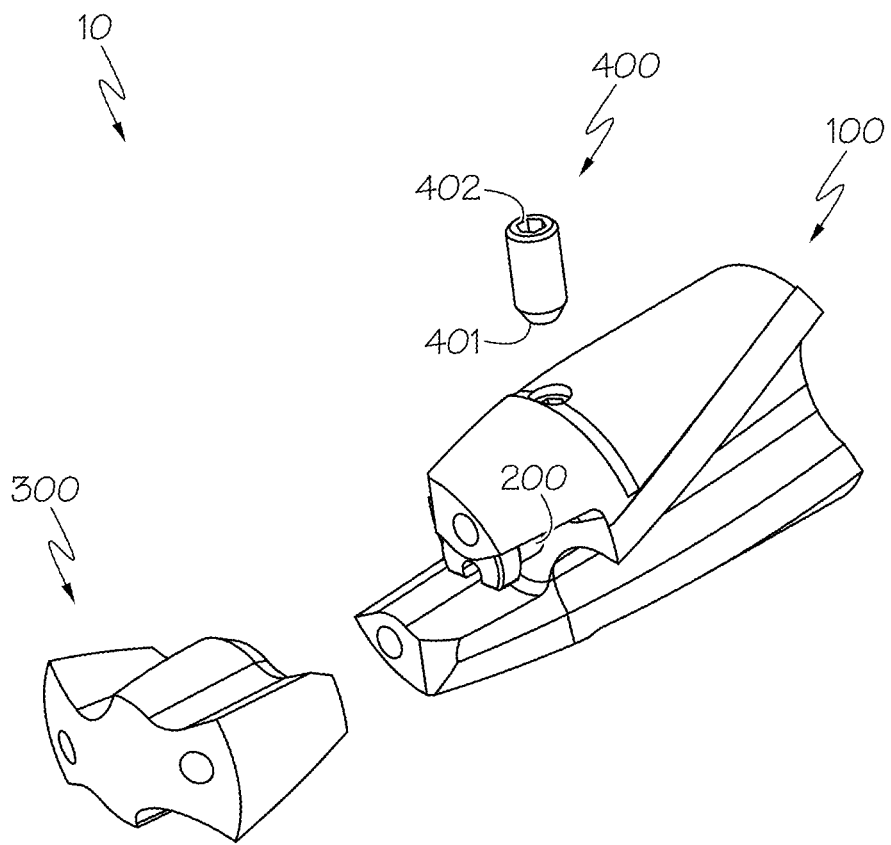
FIG. 2 is a perspective view of the exemplary modular drill of FIG. 1 in a partially assembled state, in which the retaining pin is positioned with a shank bore of the shank.
Figure 3:
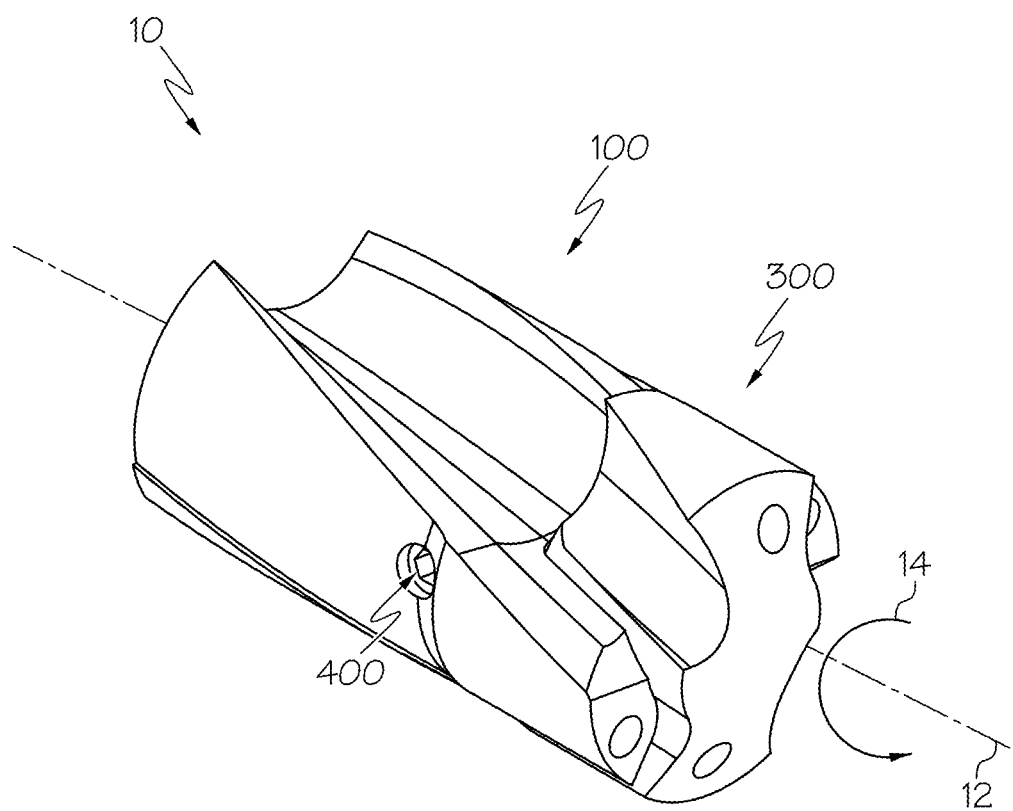
FIG. 3 is a perspective view of the exemplary modular drill of FIG. 2 in a fully assembled state, in which the cutting insert is seated within a seat of the shank and the locking pin is positioning within a locking pin opening of the shank.

FIGS. 1 to 3 illustrate an exemplary modular drill 10 according to an embodiment of the present description. The modular drill 10 defines an axial direction 12 and a rotational direction 14. The modular drill 10 includes a shank 100, a retaining pin 200, a cutting insert 300, and locking pin 400. FIGS. 4A to 4F illustrate further details of the shank 100 of FIGS. 1 to 3. FIGS. 5A to 5G illustrate further details of the retaining pin 200 of FIGS. 1 to 3. FIGS. 6A to 6G illustrate further details of the cutting insert 300 of FIGS. 1 to 3.

Referring to FIGS. 1 to 3 and FIGS. 4A to 4F, an exemplary shank 100 of the present description may include an upper shank end 101, a lower shank end 102 opposite the upper shank end 101, and a shank sidewall 103 between the upper shank end 101 and the lower shank end 102. The shank sidewall 103 may define a plurality of shank flutes 104 therein that extend about the shank sidewall 103. The plurality of shank flutes 104 may aid in removal of waste material during a cutting process. The plurality of shank flutes 104 can vary in size, shape and number of flutes.

The shank 100 may include a shank pocket 110 for seating the cutting insert 300 therein and may include shank flanks 120 at opposing sides of the shank pocket 110 for clamping the cutting insert 300 therebetween. An interior side of the shank flanks 120 may include a flank front surface 121, a flank shoulder surface 122, and a flank rear surface 123 for engaging with corresponding surfaces of the cutting insert 300 when the cutting insert 300 is seated within the shank pocket 110.

Figure 4A:
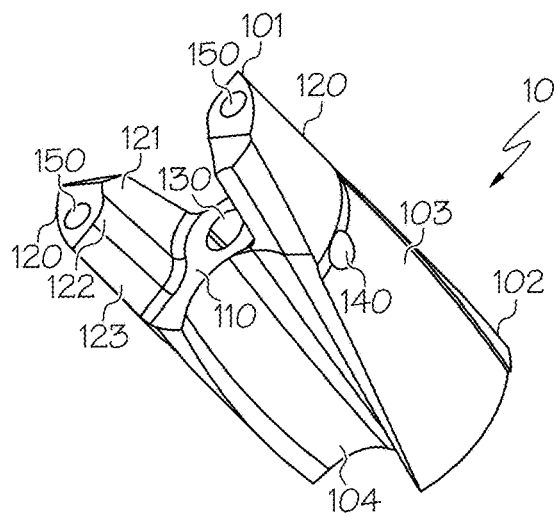
FIGS. 4A to 4D are perspective views of the shank of FIG. 1.
Figure 4B:
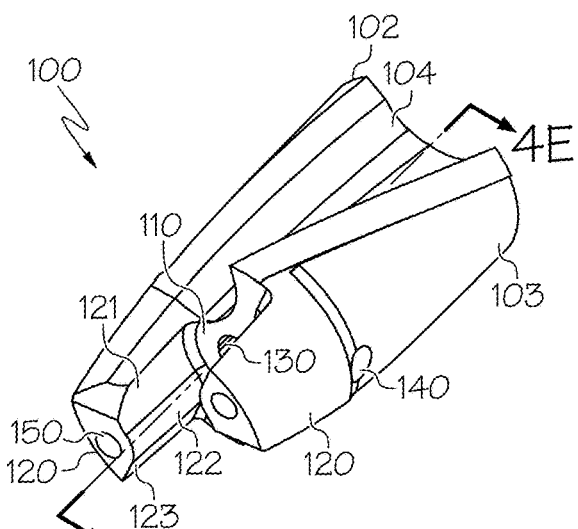
Figure 4C:
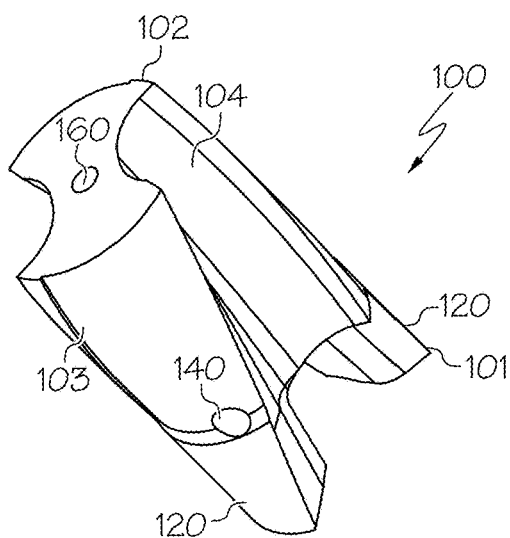
Figure 4D:
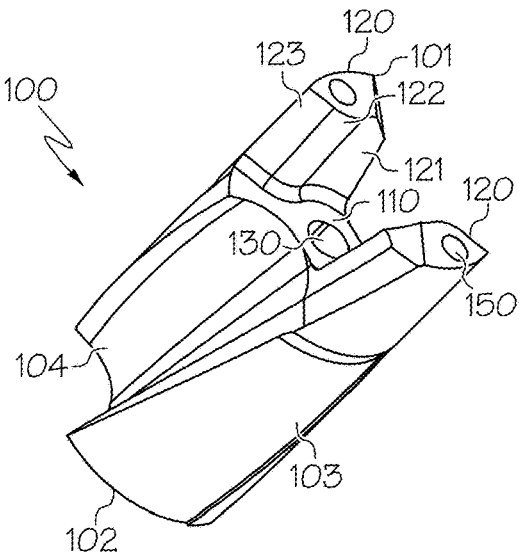
Figure 4E:
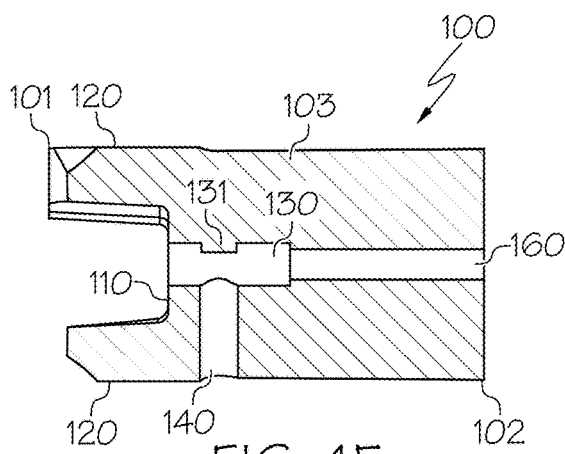
FIG. 4E is a sectional view of the shank of FIGS. 4A to 4D sectioned along section line 4-4.
Figure 4F:
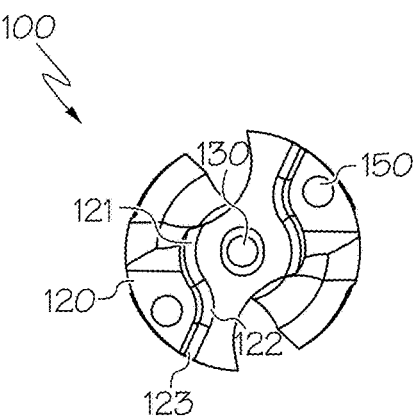
FIG. 4F is a top view of the shank of FIGS. 4A to 4E.

The shank 100 may include a shank bore 130 for receiving the retaining pin 200 therein. In one aspect, the shank bore 130 may have an anti-rotation feature for rotationally fixing the retaining pin 200 within the shank bore 130. The anti-rotation feature can include any of a variety of features capable of preventing a rotation of the retaining pin 200 when positioned with the shank bore 130. The anti-rotation features illustrated in the figures of the present description are merely provided as examples. The modular drill 10 of the present description can incorporate any known design for preventing the rotation of the retaining pin 200 when positioned with the shank bore 130. For example, as illustrated in FIG. 4F, the shank bore 130 may have a non-circular (e.g., elliptical) cross-section for engaging with a corresponding shape (e.g., elliptical shape) of the retaining pin 200 for preventing rotation of the retaining pin 200. In another example, as illustrated in FIG. 4E, the shank bore 130 may include an axial projection 131 for engagement with a corresponding axial recess 213 of the retaining pin 200 when positioned within the shank bore 130. Although the axial projection 131 is illustrated at a middle portion of the shank bore 130, it may be advantageous for manufacturing to position the axial projection 131 at an entrance of the shank bore 130 on a separate component (e.g., ring) at the entrance of the shank bore 130. The ring may be prevented from rotating with respect to the shank bore 130 and may prevent the retaining pin 200 from rotating with respect to the ring. In yet another example, the shank bore 130 may include both the non-circular (e.g., elliptical) cross-section and the axial projection 131. Any additional examples of anti-rotation features for preventing a rotation of the retaining pin 200 when positioned with the shank bore 130 could be employed for the modular drill 10 of the present description.

The shank 100 may include a locking pin opening 140 for positioning the locking pin 400 therein. In an aspect, the locking pin opening 140 may be internally threaded to facilitate movement of an externally threaded locking pin 400 towards and away from the shank bore 130. The locking pin opening 140 may be a through hole for allowing a tip of the locking pin 400 to pass through the locking pin opening 140 into engagement with the retaining pin 200.

The shank 100 may further include one or more upper cooling channels 150 and/or one or more lower cooling channels 160 to facilitate a cooling of the modular drill 10 during a cutting process, which is further described below. The cooling channels may be in fluid communication with cooling channels in the cutting insert.

The shank 100 may be manufactured from a comparatively inexpensive material having a moderate hardness, such as steel or another metal.

Referring to FIGS. 1 to 3 and FIGS. 5A to 5G, an exemplary retaining pin 200 includes a retaining pin shaft 210 and a retaining pin head 220. The retaining pin shaft 210 may include a shaft upper end 211, a shaft lower end 212 opposite the shaft upper end 211, and a shaft sidewall 213 between the shaft upper end 211 and the shaft lower end 212.

In the illustrated embodiment, the retaining pin shaft 210 includes a locking pin engagement surface 214 for engaging with the locking pin 400 to force the retaining pin shaft to move further in the axial direction 12 towards the shaft lower end 212 as further explained below.

Figure 5A:
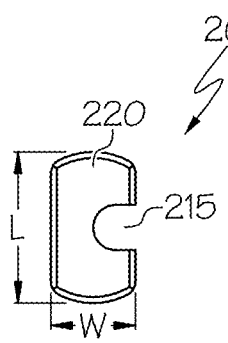
FIG. 5A is a bottom view of the cutting insert of FIG. 1.
Figure 5B:
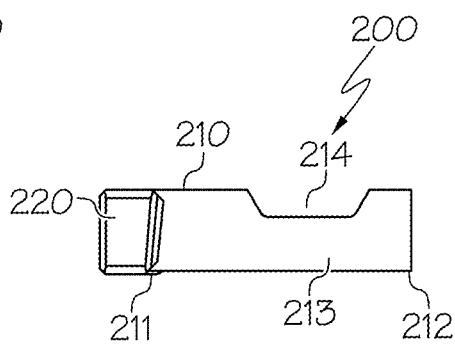
FIG. 5B is a side view of the retaining pin of FIG. 1.
Figure 5C:
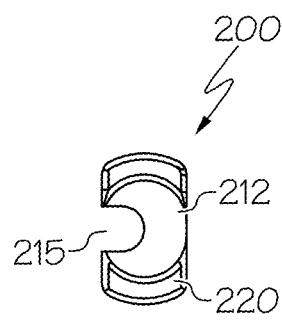
FIG. 5C is a top view of the retaining pin of FIG. 1.
Figure 5D:
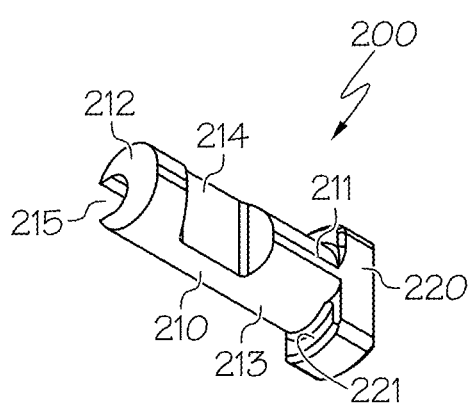
FIGS. 5D to 5G are perspective views of the cutting insert of FIG. 1.
Figure 5E:
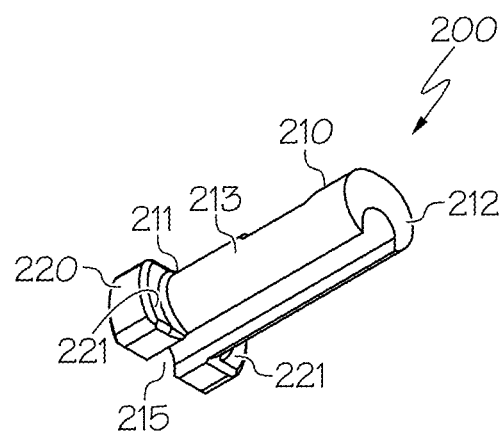
Figure 5F:
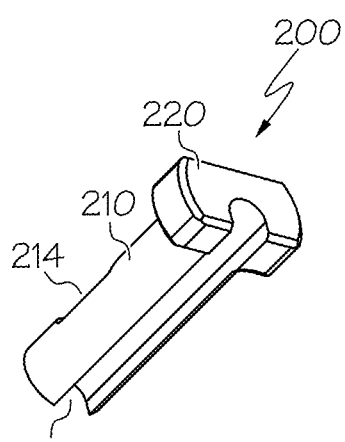
Figure 5G:
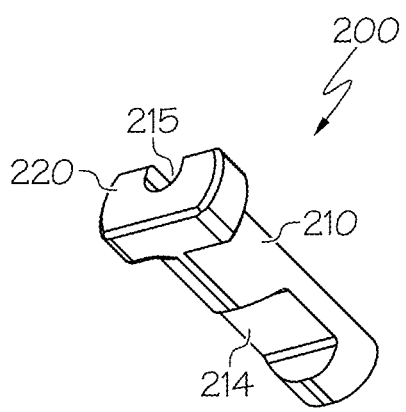

The retaining pin shaft 210 may have an anti-rotation feature for rotationally fixing the retaining pin 200 within the shank bore 130. The anti-rotation feature may include any of a variety of features capable of preventing a rotation of the retaining pin 200 when positioned with the shank bore 130. The anti-rotation features illustrated in the figures of the present description are merely provided as examples. The modular drill of the present description can incorporate any known design for preventing the rotation of the retaining pin 200 when positioned with the shank bore 130. For example, as illustrated in FIG. 5C, the retaining pin shaft 210 may have a non-circular (e.g., elliptical) cross-section for engaging with a corresponding shape (e.g., elliptical shape) of the shank bore 130 for preventing rotation of the retaining pin 200. In another example, also as illustrated in FIG. 5C, the retaining pin shaft 210 may include an axial recess 215 for engagement with a corresponding axial projection 131 of the shank bore 130. In yet another example, the retaining pin shaft 210 may include both the non-circular (e.g., elliptical) cross-section and the axial recess 215. In an aspect, the axial recess 215 may function as a coolant passage for passing a coolant the cutting insert passage to the cutting insert cavity without serving any anti-rotation function.

Any additional examples of anti-rotation features for preventing a rotation of the retaining pin 200 when positioned with the shank bore 130 could be employed for the modular drill 10 of the present description. In yet another example, the retaining pin shaft 210 may include a flat surface (in place of the axial recess 215) that extends axially and the shank 100 may have an additional pin positioned to abut the flat surface preventing rotation of the retaining pin 200.

The retaining pin head 220 may have a length L and width W, wherein the length L of the retaining pin head 220 is greater than the width W of the retaining pin head 220. For example, the retaining pin head 220 may approximate the shape of a rectangle having a length L that is greater than a width W. As such, in a first orientation, the retaining pin head 220 can pass through a passage of the cutting insert that has a similar cross-section into a cavity of the cutting insert. Then, while within the cavity, the cutting insert 300 can be rotated relative to the retaining pin head 220 to a second orientation, such that the retaining pin head 220 cannot pass through the passage of the cutting insert 300. The retaining pin head 220 may have a retaining pin head engagement surface 221 for engaging with the cutting insert 300. By engagement of the retaining pin head engagement surface 221 with the cutting insert 300, the retaining pin head 220 functions to retain the cutting insert 300 within the shank pocket 110.

The retaining pin 200 may be manufactured from a comparatively inexpensive material having a relative high hardness, such as hardened steel, tool steel, tungsten carbide or another metal.

Referring to FIGS. 1 to 3 and FIGS. 6A to 6G, an exemplary cutting insert 300 of the present description includes an upper cutting insert end 301, a lower cutting insert end 302 opposite the upper cutting insert end 301, and a cutting insert sidewall 303 between the upper cutting insert end 301 and the lower cutting insert end 302. The cutting insert sidewall 303 may define a plurality of cutting insert flutes 304 that extend about the cutting insert sidewall 303. When the cutting insert 300 is seated in the shank pocket 110, each cutting insert flute 304 may be aligned with a corresponding shank flute 104.

The cutting insert 300 may be clamped by the shank flanks 120 when the cutting insert sidewall 303 is seated in the shank pocket 110. For example, the cutting insert sidewall 303 may be clamped by an interference fit between the shank flanks 120 and the cutting insert 300. Any arrangement may be employed for creating an interference fit for clamping the cutting insert 300 by the shank flanks 120. The illustrated modular drill 10 shows one exemplary arrangement for creating an interference fit for clamping the cutting insert 300 by the shank flanks 120. Other arrangements for creating an interference fit are included in the present description. Referring to the illustrated exemplary modular drill 10, the cutting insert sidewall 303 may include a cutting insert front surface 319, a cutting insert counter surface 322, and a cutting insert rear surface 323 for engaging with corresponding surfaces of the shank flanks 120. When the cutting insert 300 is inserted into the shank pocket 110, the cutting insert front surface 319 may contact the flank shoulder surface 122 or flank front surface 121. Depending on the axial position of the cutting insert 300, the shank flanks 120 may be elastically deformed outwardly. The cutting insert 300 is then rotated such that the cutting insert rear surface 323 is aligned with flank rear surface 123. The locking pin 400 can then be actuated and will cause the retaining pin 200 to move axially further into the shank bore 130 thereby pulling the insert 300 against the shank pocket 110. The shank flanks 120 will be deformed elastically outwardly. When the cutting insert 300 is in the final seated position, the cutting insert front surface 319 may be positioned directly in contact with the flank front surface 121, and the cutting insert rear surface 323 may be positioned directly adjacent to the flank rear surface 123.

The cutting insert sidewall 303 may include a cutting insert passage 330 for passing the retaining pin head 220 therethrough and a cutting insert cavity 350 accommodating the retaining pin head 220 therein. Referring to FIG. 5A, the cutting insert passage 330 may having a length l and width w, wherein the length l of the cutting insert passage 330 is greater than the width w of the cutting insert passage 330. For example, the cutting insert passage 330 may approximate the shape of a rectangle having a length l that is greater than a width w. Also, the length l of the cutting insert passage 330 may be greater than the length L of the retaining pin head 220, and the width w of the cutting insert passage 330 may be greater than the width of the retaining pin head 220 and less than the length of the retaining pin head 220. As such, in a first orientation, the retaining pin head 220 can pass through the cutting insert passage 330 of the cutting insert into the cutting insert cavity 350 of the cutting insert 300. Then, while the retaining pin head 220 is in the cutting insert cavity 350, the cutting insert 300 can be rotated while the retaining pin head 220 remains stationary, such that the retaining pin head engagement surface 221 of the retaining pin head 220 engages a cutting insert engagement surface 351 of the cutting insert cavity 350. Thus, by engagement of the retaining pin head engagement surface 221 and the cutting insert engagement surface 351, the retaining pin head 220 cannot pass back through the cutting insert passage 330 of the cutting insert 300, and, thus, the retaining pin head 220 can retain the cutting insert 300 within the shank pocket 110.

In another aspect, the cutting insert 300 may be locked into the shank pocket 110, and the cutting insert 300 may be prevented from rotating back to the first orientation by the interference between the cutting insert 300 and the shank flanks 120 of the shank 100 when in the locked state. Thus, in the locked state, the retaining pin head 220 retains the cutting insert 300 within the shank pocket 110 by engagement of the retaining pin head engagement surface 221 and the cutting insert engagement surface 351.

The cutting insert 300 may include one or more cooling channels 340 to facilitate a cooling of the modular drill 10 during a cutting process. In an aspect, the one or more cooling channels 340 may be in fluid communication with the cutting insert cavity 350, which is further described below.

The cutting insert 300 may be manufactured from a harder and more expensive material, such as carbide, cermet, ceramics, and the like, which provides a good chip-removing capacity, good machining precision and long service life. In other words, the cutting insert 300 functions as a wear part that can be discarded after wear-out, while the shank 100 can be re-used with a new cutting insert 300.

Referring to FIGS. 1 to 3, the locking pin 400 may include a locking pin tip 401, which may be, for example spherical, conical, or cylindrical. The locking pin 400 may be manufactured from a comparatively inexpensive material having a moderate hardness, such as steel or another metal. The locking pin 400 may be sized to pass through the locking pin opening 140 of the shank 100. In an aspect, the locking pin 400 may be externally threaded to facilitate movement of the locking pin 400 towards and away from the shank bore 130 and into engagement with the locking pin engagement surface 214 of the retaining pin 200. By engagement of the locking pin 400 with the locking pin engagement surface 214, the locking pin 400 may force the retaining pin 200 to move further in the axial direction into the shank bore 130 to thereby lock the cutting insert 300 into a final position within the shank pocket 110. As shown, the locking pin 400 and locking pin opening 140 may be positioned substantially perpendicular to the shank bore 130. However, it is not necessary that the locking pin 400 and locking pin opening 140 are perpendicular to the shank bore 130. Any arrangements of the locking pin 400 and locking pin opening 140 that can force the retaining pin 200 to move further in the axial direction into the shank bore 130 are included in the present description.

In an aspect, the cutting insert 300 may include one or more cooling channels therein configured to pass coolant from the cutting insert cavity to a cutting end of the cutting insert 300. The coolant may pass through the cutting insert passage to the cutting insert cavity 350 to the cutting end of the cutting insert 300. The shank 100 may further include one or more upper cooling channels 150 and/or one or more lower cooling channels 160 to facilitate a cooling of the modular drill 10 during a cutting process, which is further described below. The cooling channels of the shank 100 may be in fluid communication with the cooling channels 340 in the cutting insert.

Referring to the illustrated drawings, FIGS. 6A to 6E show a cutting insert passage 330 and FIGS. 5A to 5G show an axial recess 215. The coolant may flow from the shank 100 through the cutting insert passage 330 by way of the axial recess 215 to enter the cutting insert cavity 350, which accommodates the retaining pin head 220 therein. Meanwhile, the coolant may flow around the retaining pin head 220 to the one or more cooling channels 340 which lead to the cutting end of the cutting insert 300. Accordingly, the cutting insert passage 330 and the cutting insert cavity 350 may serve a dual purpose of facilitating assembly the modular drill 10 and facilitating a cooling of the cutting insert 300 during the cutting process.

According to another embodiment of the present, there is a method of assembly for the modular drill 10. The method may include positioning the cutting insert 300 into the shank pocket 110 while the retaining pin head 220 of the retaining pin 200 is passed through the cutting insert passage 330 into the cutting insert cavity 350. The retaining pin head engagement surface 321 of the retaining pin 320 engages with the cutting insert engagement surface 351 of the cutting insert cavity 350. In an aspect, the method further includes rotating the cutting insert 300 relative to the retaining pin head 220 and shank 100 after passing the retaining pin head 220 through the cutting insert passage 330 into the cutting insert cavity 350 to place the retaining pin head engagement surface 321 of the retaining pin 320 into engagement with the cutting insert engagement surface 351 of the cutting insert cavity 350.

After retaining pin head engagement surface 321 of the retaining pin 320 engages with the cutting insert engagement surface 351, the retaining pin shaft 210 of the retaining pin 200 is moved in the axial direction 12 leading into the shank bore 130 of shank 100 to lock the cutting insert 300 to the shank 100. The step of moving the retaining pin shaft 210 in the axial direction 12 can be accomplished by any means. In an example, the retaining pin shaft 210 can be moved in the axial direction 12 further into the shank bore 130 by a spring (not shown). In another example, the retaining pin shaft 210 can be moved in the axial direction 12 further into the shank bore 130 by a locking pin 400 as shown in the accompanying drawings.

Referring the accompanying drawings, the step of moving the retaining pin shaft 210 in the axial direction 12 may include engaging the locking pin 400 against the retaining pin shaft 210. In this case, the step of engaging the locking pin 400 against the retaining pin shaft 210 may include screwing the locking pin 400 towards the retaining pin shaft 210.

In an aspect, there may remain a gap between the shank 100 and the cutting insert 300 when in an unlocked state. Thus, when the cutting tip is initially inserted in the drill body, surface 302 may remain at a certain distance from surface 110 such there is a gap as illustrated in the accompanying figures. The gap may be caused by, for example, an interference between the cutting insert 300 and the shank flanks 120. Then, when the cutting insert 300 is rotated, it is pushed down by the contact of surfaces 221 and 351 and the gap is closed. Alternatively, the gap may be closed by engaging the locking pin 400 against the retaining pin shaft 210 to pull down the retaining pin shaft 210.

FIGS. 7 to 11 show an exemplary method of assembly of the modular drill 10 of FIG. 1 from an unassembled of first state to a fully assembled fifth state.

Figure 7A:
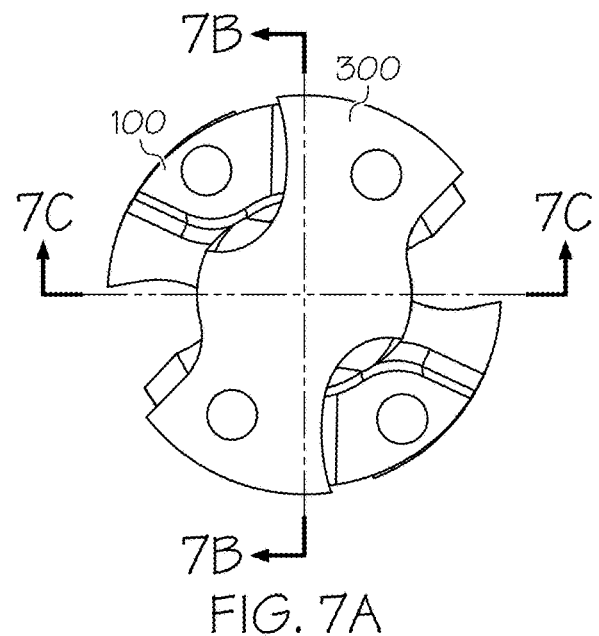
FIG. 7A is a top view of the modular drill of FIG. 1 in a first state.
Figure 7B:
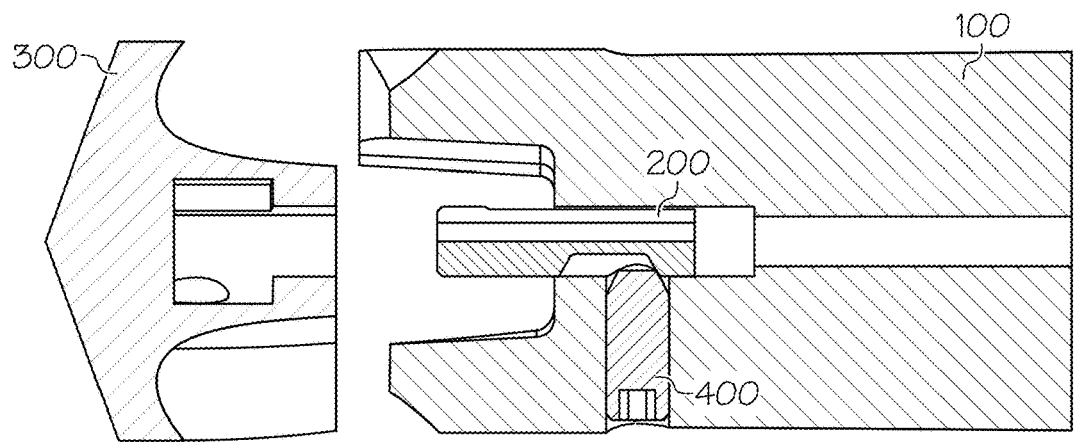
FIGS. 7B and 7C are sectional views of the modular drill of FIG. 7A, in which the retaining pin is positioned with a shank bore of the shank.
Figure 7C:
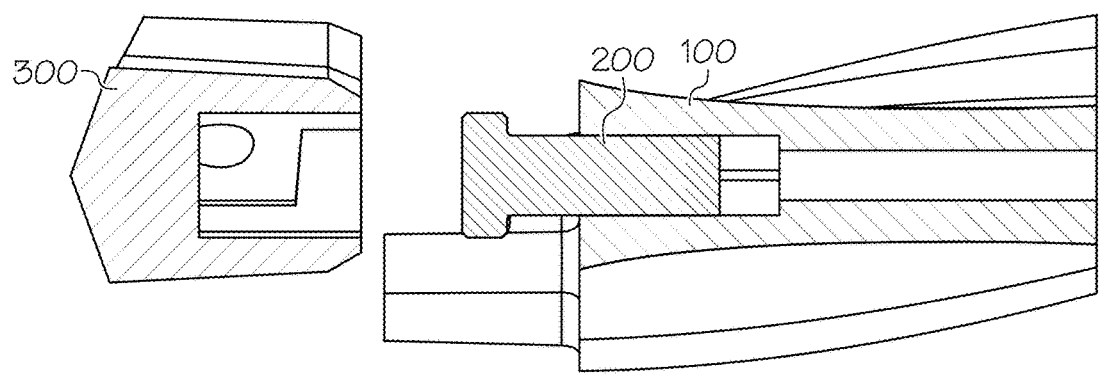

FIGS. 7A, 7B, and 7C shown the modular drill 10 in a first state, in which the retaining pin 200 is positioned with the shank bore 130 of the shank 100. In this state, the retaining pin 200 is rotationally fixed within the shank bore 130 and able to be moved in the axial direction.

Figure 8A:
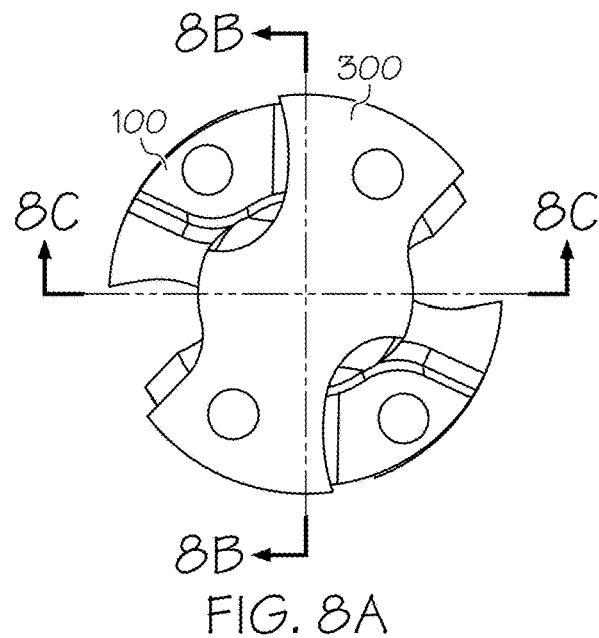
FIG. 8A is a top view of the modular drill of FIG. 1 in a second state.
Figure 8B:
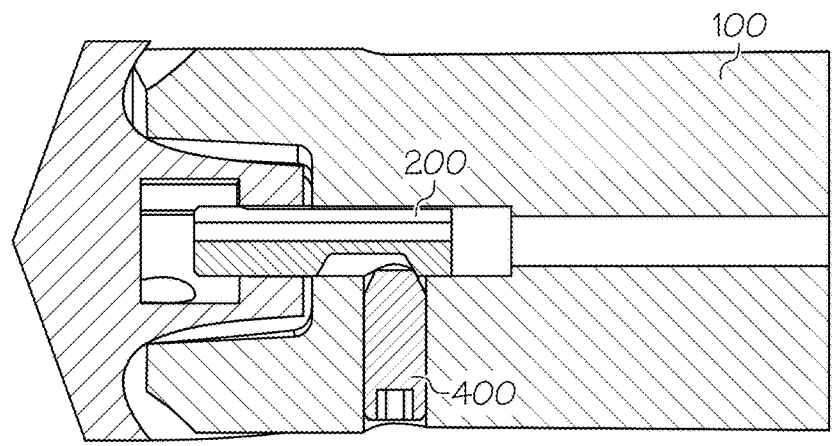
FIGS. 8B and 8C are sectional views of the modular drill of FIG. 8A, in which the cutting insert is positioned into a shank pocket of the shank having the retaining pin.
Figure 8C:
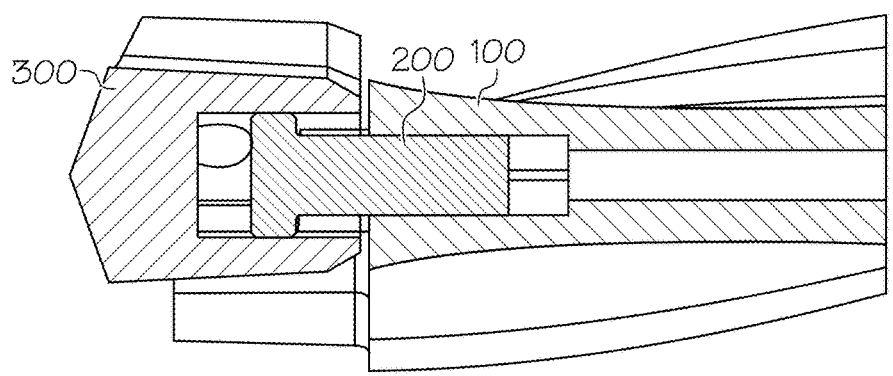

FIGS. 8A, 8B, and 8C shown the modular drill 10 in a second state, in which the cutting insert 300 is positioned within the shank pocket 110 between the shank flanks 120 while the retaining pin head 220 is passed through the cutting insert passage 330 of the cutting insert 300 and positioned within the cutting insert cavity 350 of the cutting insert 300.

Figure 9A:
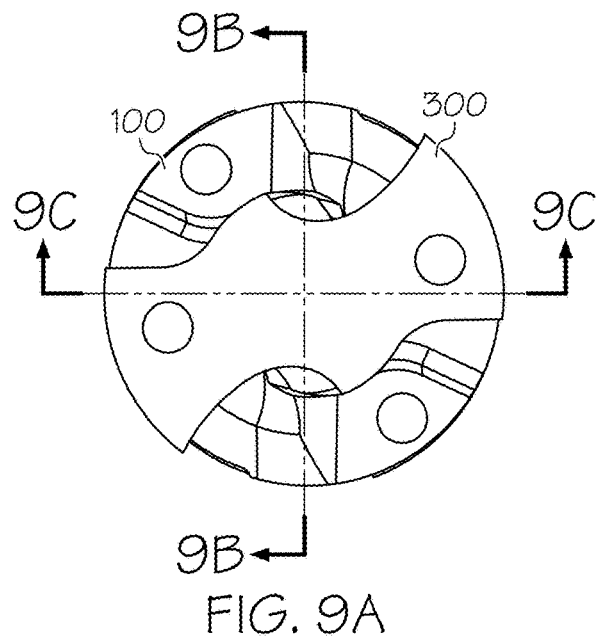
FIG. 9A is a top view of the modular drill of FIG. 1 in a third state.
Figure 9B:
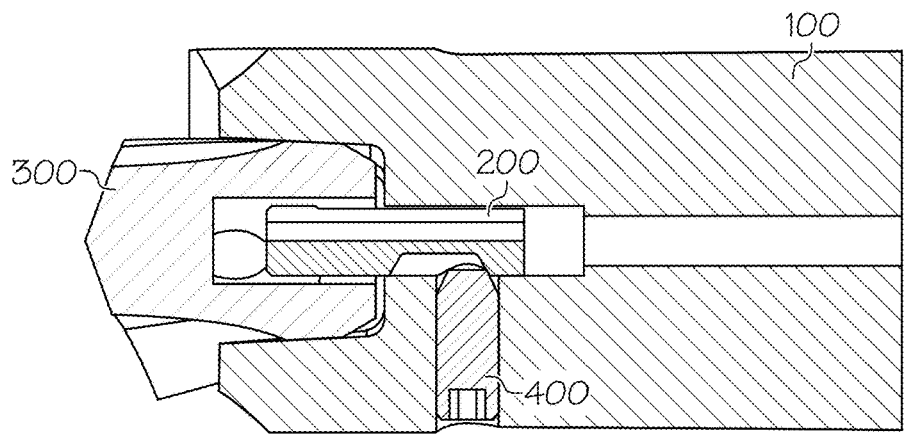
FIGS. 9B and 9C are sectional views of the modular drill of FIG. 9A, in which the cutting insert is partially rotated with respect to the shank and the retaining pin.
Figure 9C:
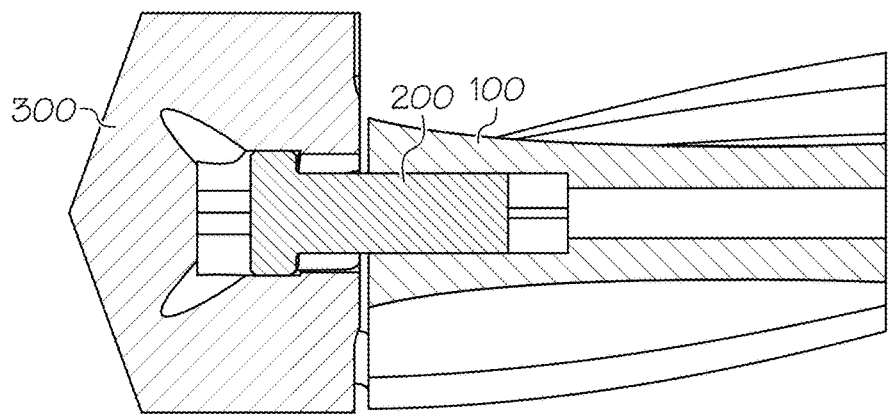

FIGS. 9A, 9B, and 9C shown the modular drill 10 in a third state, in which the cutting insert 300 is partially rotated with respect to the shank 100 and the retaining pin 100.

Figure 10A:
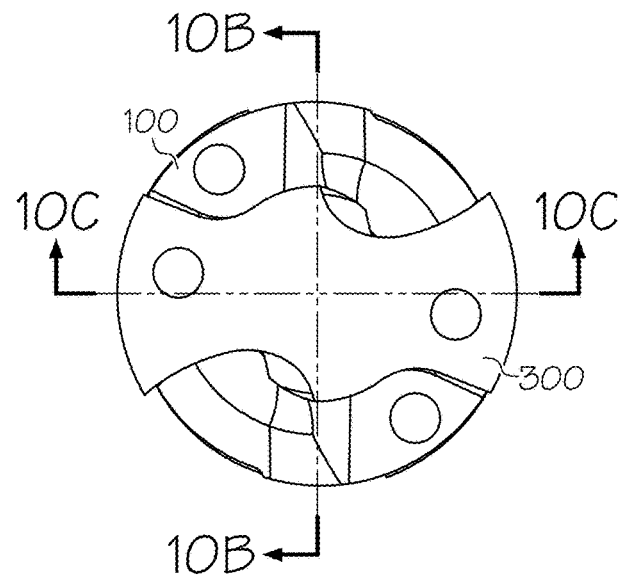
FIG. 10A is a top view of the modular drill of FIG. 1 in a fourth state.
Figure 10B:
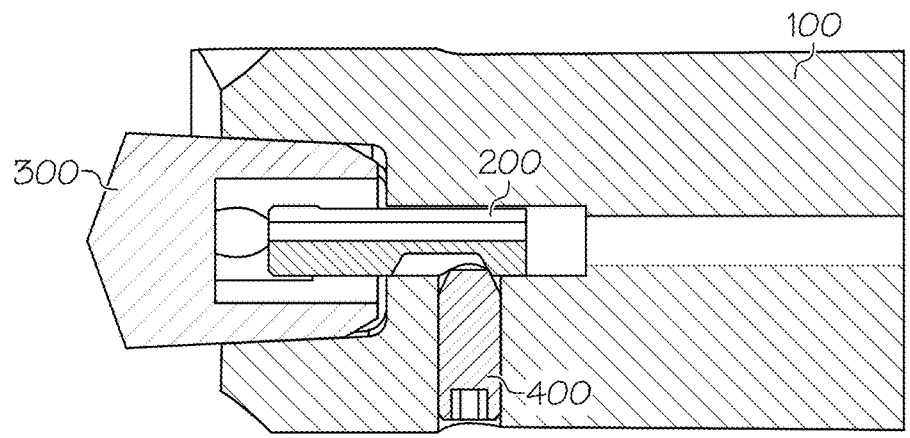
FIGS. 10B and 10C are sectional views of the modular drill of FIG. 10A, in which the cutting insert is fully rotated with respect to the shank and the retaining pin.
Figure 10C:
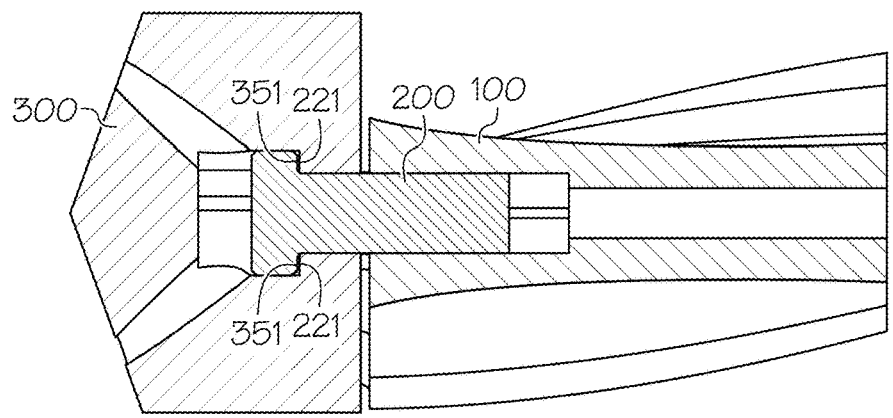

FIGS. 10A, 10B, and 10C shown the modular drill 10 in a fourth state, in which the cutting insert 300 is fully rotated with respect to the shank 100 and the retaining pin 100. In this unlocked state, a gap remains between the shank 100 and the cutting insert 300.

Figure 11A:
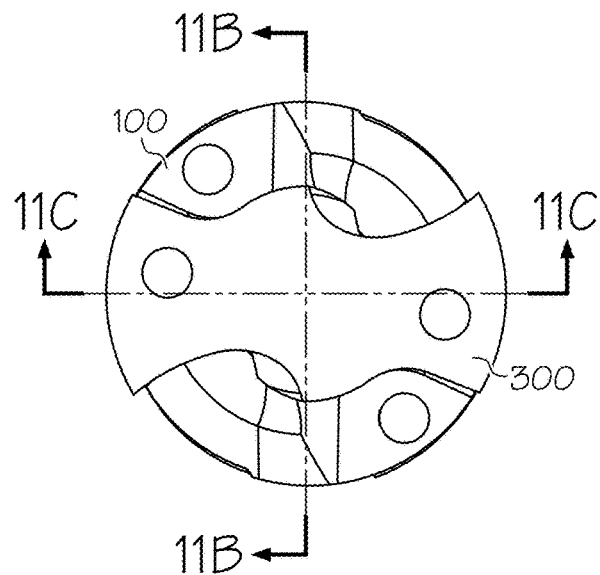
FIG. 11A is a top view of the modular drill of FIG. 1 in a fifth state.
Figure 11B:
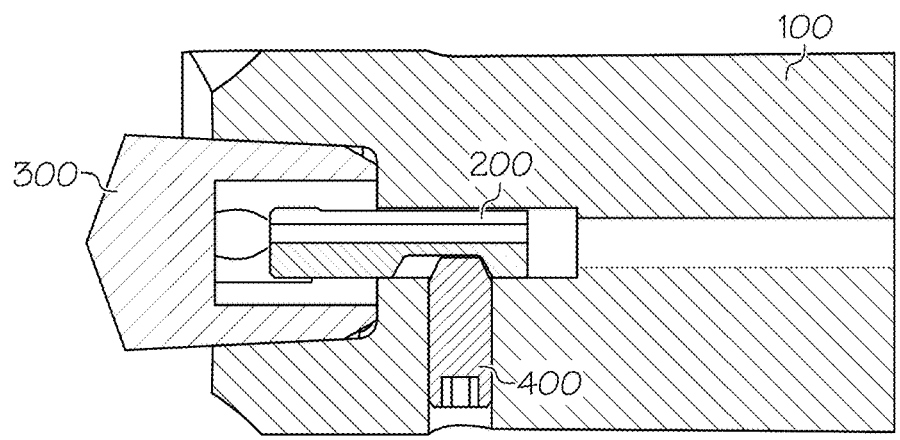
FIGS. 11B and 11C are sectional views of the modular drill of FIG. 11A, in which the cutting insert is moved in the axial direction leading into the shank bore of shank to lock the cutting insert to the shank by engagement of the locking pin with the retaining pin.
Figure 11C:
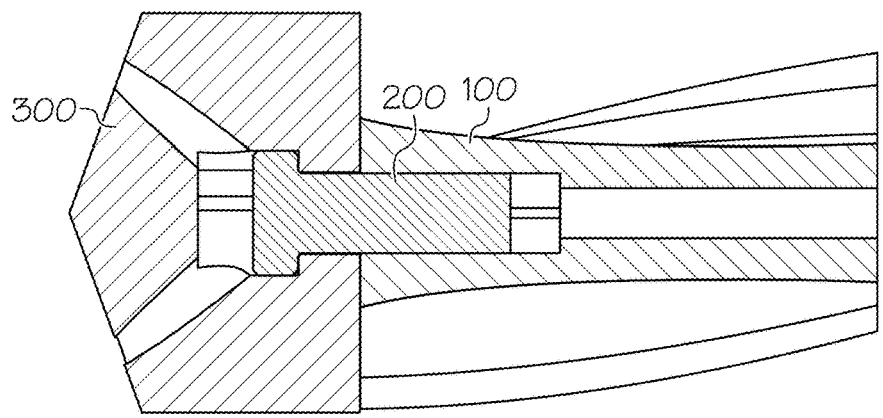

FIGS. 11A, 11B, and 11C shown the modular drill 10 in a fifth state, in which the cutting insert is forced to move, by engagement of the locking pin 400 with the locking pin engagement surface 214, in the axial direction 12 leading into the shank bore 130 of shank 100 to lock the cutting insert 300 to the shank 100. In this locked state, the cutting insert 300 is fully seated within the shank pocket 110 and the gap between the shank 100 and the cutting insert 300 may be closed.

In the fifth state shown in FIGS. 11A, 11B, and 11C, the cutting insert 300 may be locked into the shank pocket 110, and the cutting insert 300 may be prevented from rotating back to the first orientation by the interference between the cutting insert 300 and the shank flanks 120 of the shank 100 when in this locked state. Thus, in the locked state, the retaining pin head 220 retains the cutting insert 300 within the shank pocket 110 by engagement of the retaining pin head engagement surface 221 and the cutting insert engagement surface 351.

An advantage of the modular drill 10 of the present description is that it enables for improved design freedom and relaxed manufacturing tolerances. Particularly, by allowing the retaining pin 200 to move axially within the shank bore 130, the modular drill 10 can accommodate manufacturing tolerance deviations by locking the cutting insert 300 to the shank 100 regardless of the manufacturing tolerance deviations.

Although various embodiments of the disclosed modular drill have been shown and described, modifications may occur to those skilled in the art upon reading the specification. The present application includes such modifications and is limited only by the scope of the claims.

What is claimed is:

1. A cutting insert for a modular drill, the cutting insert comprising:
   a cutting insert body having an upper end and a lower end, and a cutting insert sidewall extending between the upper end and the lower end, the cutting insert sidewall comprising a cutting insert flute, a cutting insert front surface, a cutting insert counter surface, and a cutting insert rear surface, wherein the cutting insert front surface is conically-shaped and is located between the cutting insert flute and the cutting insert counter surface, the cutting insert counter surface is located between the cutting insert front surface and the cutting insert rear surface, and both the cutting insert front surface and the cutting insert counter surface are curved; and
   a cutting insert passage for passing a retaining pin head therethrough, the cutting insert passage leading from the lower surface of the cutting insert body to a cutting insert cavity, the cutting insert cavity defining a lower wall substantially parallel to the lower surface of the cutting insert body comprising a cutting insert engagement surface for engaging with a retaining pin head passed through the cutting insert passage into the cutting insert cavity.

2. The cutting insert of claim 1, wherein the cutting insert passage comprises a length and a width, wherein the length is greater than the width.

3. The cutting insert of claim 2, wherein the cutting insert passage is rectangular.

4. The cutting insert of claim 1, further comprising at least one cooling channel in fluid communication with the cutting insert cavity.

5. The cutting insert of claim 4, wherein the at least one cooling channel extends from the cutting insert passage to the cutting insert cavity.

6. The cutting insert of claim 5, wherein the at least one cooling channel extends from the cutting insert cavity to at least one cutting end of the cutting insert.

7. The cutting insert of claim 6, wherein the at least one cooling channel is disposed in the upper end.

8. The cutting insert of claim 1, wherein the cutting insert cavity is disposed within an interior of the cutting insert between the upper end and the lower end.

9. The cutting insert of claim 1, wherein the cutting insert is non-circular.

10. The cutting insert of claim 1, wherein the cutting insert front surface is convex, and the cutting insert counter surface is concave.

11. The cutting insert of claim 10 wherein the cutting insert rear surface is linear.

12. The cutting insert of claim 11 further comprising a curved exterior surface extending between the upper end and the lower end, wherein the cutting insert rear surface is located between the cutting insert counter surface and the curved exterior surface.

13. A cutting insert for a modular drill, the cutting insert comprising:
    a cutting insert body having an upper end and a lower end, and a cutting insert sidewall extending between the upper end and the lower end, the cutting insert sidewall comprising a cutting insert flute, a cutting insert front surface, a cutting insert counter surface, and a cutting insert rear surface, wherein the cutting insert front surface is conically-shaped and is located between the cutting insert flute and the cutting insert counter surface, the cutting insert counter surface is located between the cutting insert front surface and the cutting insert rear surface, and both the cutting insert front surface and the cutting insert counter surface are curved; and
    a cutting insert passage for passing a retaining pin head therethrough, the cutting insert passage leading from the lower surface of the cutting insert body to a cutting insert cavity, the cutting insert passage comprising a length and a width, wherein the length is greater than the width, the cutting insert cavity defining a lower wall substantially parallel to the lower surface of the cutting insert body comprising a cutting insert engagement surface for engaging with a retaining pin head passed through the cutting insert passage into the cutting insert cavity; and
    at least one cooling channel in fluid communication with the cutting insert cavity.

14. The cutting insert of claim 13, wherein the cutting insert passage is rectangular.

15. The cutting insert of claim 13, wherein the at least one cooling channel extends from the cutting insert passage to the cutting insert cavity.

16. The cutting insert of claim 15, wherein the at least one cooling channel extends from the cutting insert cavity to at least one cutting end of the cutting insert.

17. The cutting insert of claim 16, wherein the at least one cooling channel is disposed in the upper end.

18. The cutting insert of claim 13, wherein the cutting insert cavity is disposed within an interior of the cutting insert between the upper end and the lower end.

19. The cutting insert of claim 13, wherein the cutting insert is non-circular.

20. The cutting insert of claim 13 wherein the cutting insert front surface is convex, and the cutting insert counter surface is concave.

21. The cutting insert of claim 20 wherein the cutting insert rear surface is linear.

22. The cutting insert of claim 21 further comprising a curved exterior surface extending between the upper end and the lower end, wherein the cutting insert rear surface is located between the cutting insert counter surface and the curved exterior surface.

* * * * *